United States Patent [19]

Kildal et al.

[11] 4,107,544
[45] Aug. 15, 1978

[54] TWO-PHOTON RESONANT LASER MIXING IN MOLECULAR LIQUIDS

[75] Inventors: Helge Kildal; Steven R. J. Brueck, both of Acton, Mass.

[73] Assignee: Massachusetts Institute of Technology, Cambridge, Mass.

[21] Appl. No.: 794,328

[22] Filed: May 5, 1977

[51] Int. Cl.$^2$ .............................................. H03F 7/00
[52] U.S. Cl. ............................. 307/88.3; 331/94.5 L
[58] Field of Search ...................... 307/88.3; 321/69 R

[56] References Cited

U.S. PATENT DOCUMENTS 3,793,541  2/1974  Ashkin et al. ....................... 307/88.3

Primary Examiner—Rudolph V. Rolinec
Assistant Examiner—Darwin R. Hostetter
Attorney, Agent, or Firm—Arthur A. Smith, Jr.; Martin M. Santa; Robert Shaw

[57] ABSTRACT

Liquid mixtures are used as the active medium in two-photon resonant four-wave mixing processes to achieve efficient nonlinear conversion of infrared laser frequencies. The resonant energy levels involved in these four-wave mixing processes are Raman-active vibrational modes of a molecular species which is one of the major constituents of the liquid mixture. Additional molecular and/or atomic constituents are added to the active molecular species to adjust the dispersion of the medium to optimize the nonlinear process. Diluents further may be used to fine-tune the two-photon resonance parameters to better match available infrared laser sources.

24 Claims, 5 Drawing Figures

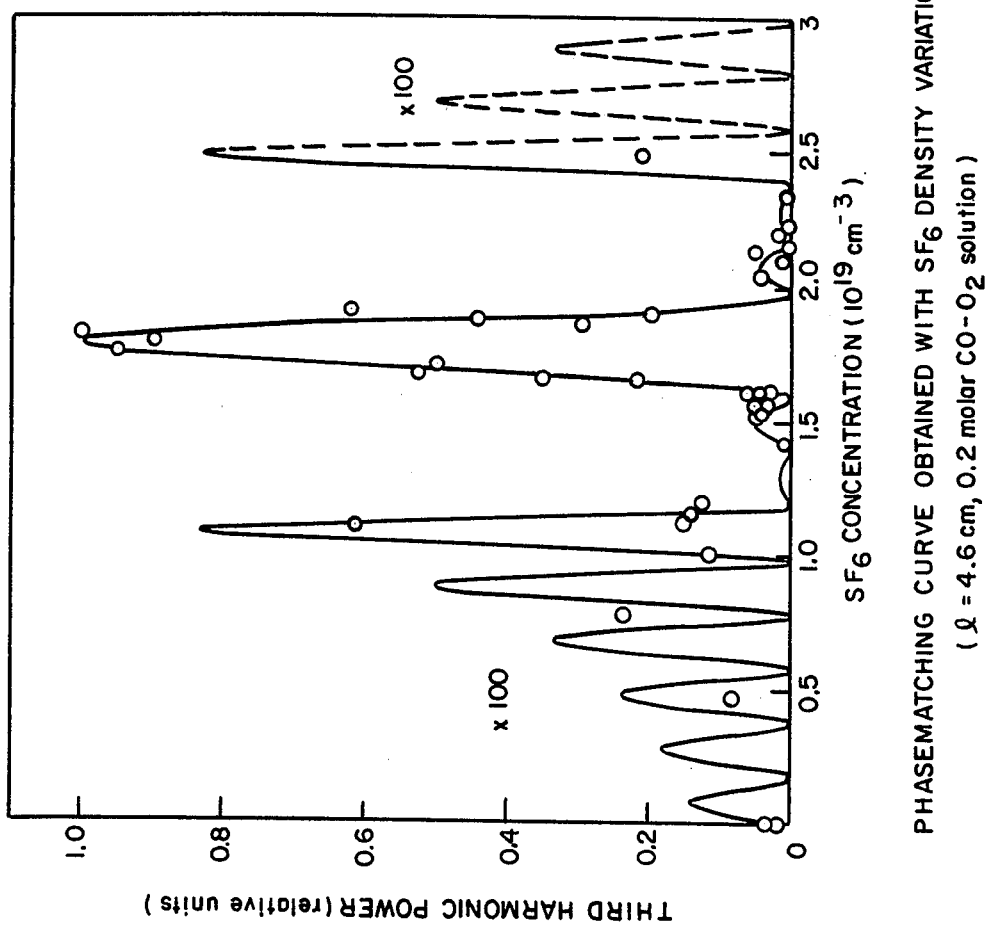

TWO-PHOTON RESONANT LASER MIXING IN MOLECULAR LIQUIDS

The invention described herein was made in the course of work performed under Contract Number F19628-76-C-0002 with the Department of the Air Force.

BACKGROUND OF THE INVENTION

This invention relates to nonlinear frequency conversion of infrared laser sources and in more detail to the use of molecular liquids as the active media in two-photon resonant four-wave mixing processes to achieve efficient nonlinear conversion of infrared laser frequencies.

All laser applications have some degree of wavelength dependence which can be optimized by varying the laser frequency. Thus, for example, military and communications applications depend upon atmospheric transmission characteristics which are highly wavelength dependent; laser photochemistry applications require very precise tuning of the laser frequency to atomic and molecular resonances. Existing sources cannot meet all of these varying wavelength requirements. Nonlinear mixing techniques in which existing laser frequencies are combined are a useful means of generating coherent light sources at new frequencies which are not presently available from primary laser sources.

Crystals used to generate sum and difference frequencies between two laser frequencies have been the most commonly used nonlinear elements to date. For many potential applications these crystals are inadequate because of limited size, poor crystal quality and low breakdown thresholds.

Since liquids and gases are isotropic media, they cannot be used in three-wave processes such as sum and difference frequency generation. However, higher order nonlinear processes are possible and, in particular, four-wave processes in which three laser frequencies are combined to generate a fourth frequency are the lowest order nonlinear processes allowed by symmetry considerations in such isotropic media. If $\omega_1$, $\omega_2$ and $\omega_3$ are used to designate the three input frequencies to the nonlinear device then the most general expression for the output frequency is $\omega_{4\pm\pm} = |\omega_1 \pm \omega_2 \pm \omega_3|$.

Such four-wave interactions have previously been demonstrated in solids and gases in the infrared spectral region. The efficiencies, however, particularly for gases have been too low to allow construction of practical devices. The highest reported efficiency for third harmonic generation (THG) of $CO_2$ laser radiation, $\omega_4 = 3\omega_1$, is $10^{-6}$ using the crystal $CdGeAs_2$. Only one previous report of a four-wave process in a liquid medium has been given; this was a THG process in a room temperature organic liquid pumped with a 1.06 $\mu$m input laser wavelength. The efficiency was not reported but was presumably quite low. The efficiencies of four-wave mixing processes can be substantially enhanced by making use of intermediate state resonances. This approach has been demonstrated in the infrared for THG in CO gas at pressures up to several atmospheres using the $CO_2$ pump lines R(8) and R(10) at 9.3 $\mu$m which are in two-photon resonance with the vibrational-rotational lines of the CO Q-branch transitions at 4.7 $\mu$m. However, the best reported efficiency is only $10^{-8}$, still too low to be a practical device.

It is therefore an object of the invention to provide a more efficient nonlinear frequency converter for laser frequencies.

It is a further object of this invention to provide this function in a relatively compact device.

Features of the invention include the ability to recover from any optically induced breakdown without degradation of the device function and the ability to flow the active medium in high average power applications.

DESCRIPTION OF THE DRAWINGS

Other advantages, features, and objects of the invention will appear from the following description taken together with the drawings in which;

FIG. 3 is a plot of third harmonic power as the medium indices of refraction are varied by adding an additional positively dispersive molecular constituent in the loose focusing limit.

SUMMARY OF THE INVENTION

Figure 1:
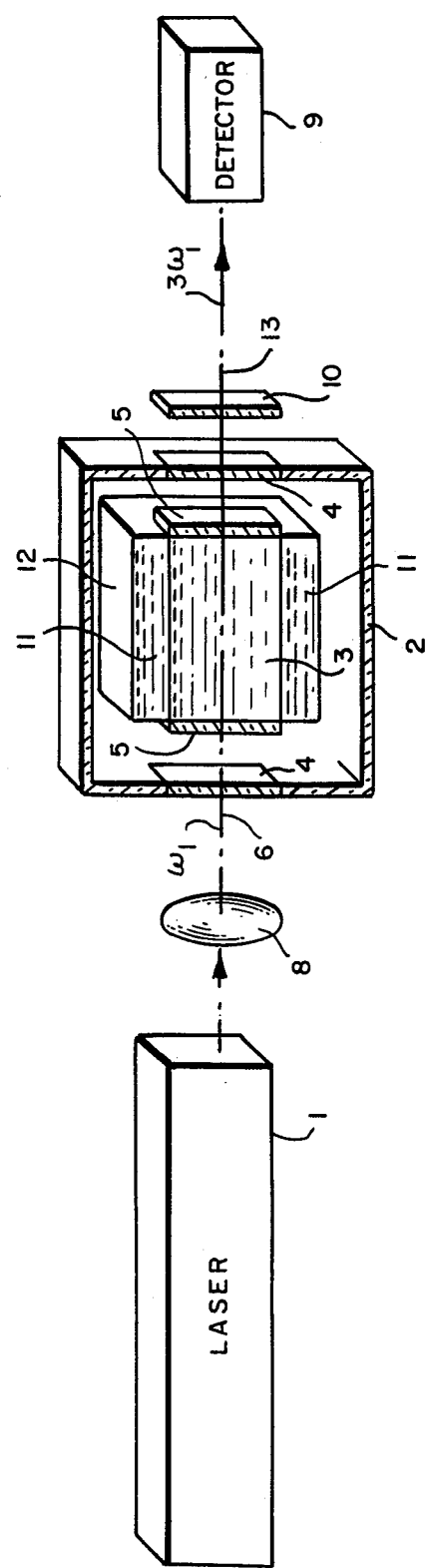
FIG. 1 is a partial cross-sectional perspective view of the apparatus of the invention.

According to the present invention, liquid mixtures are used as the active medium in two-photon resonant four-wave mixing processes to achieve nonlinear conversion of infrared laser frequencies. A Raman-active vibrational mode (vibrational frequency $\nu$) of a molecular species which is a constituent of the liquid mixture is chosen to closely match the sum of two infrared laser frequencies ($\omega_1 + \omega_2$). In the most general embodiment of the invention, a third infrared laser frequency ($\omega_3$), generated either in the same or in a different laser, is then simultaneously applied to the liquid medium and outputs are generated at the frequencies $\omega_{4\pm} = \omega_1 + \omega_2 \pm \omega_3$. If only one laser frequency is used, the limiting case of third harmonic generation, $\omega_{4+} = 3\omega_1$, is obtained. Additional molecular and/or atomic species may be added to the liquid mixture. These can serve any or all of several purposes: (1) to fine-tune the molecular vibrational resonance frequency $\nu$ relative to the sum of the incident laser frequencies ($\omega_1 + \omega_2$); (2) to vary the linewidth of the two-photon resonant transition of the active molecule; (3) to adjust the dispersion of the liquid medium to optimize the four-wave mixing process. This optimization will vary depending upon the focusing parameters of the incident laser beams in the liquid mixture.

DESCRIPTION OF THE INVENTION

Liquid media have substantial advantages over solid state and gaseous media for four-wave mixing applications.

Specifically, as compared to solids, liquid media are readily obtainable without elaborate and difficult crystal growth procedures. Further liquid media can be made with much higher purities than crystalline nonlinear optical materials which results in much higher breakdown thresholds under high intensity laser irradiation. Also, should a laser breakdown threshold be inadvertently reached in the operation of a nonlinear optical device, the liquid medium is only temporarily disrupted whereas the crystalline medium is permanently damaged and must be repolished or replaced.

As compared to gases, liquid media provide a much higher density medium with consequently higher nonlinear figures of merit. Densities comparable to those of liquid media can only be obtained in the gas phase at very high pressures of the order of 1000 atmospheres. The use of such high pressures is incompatible with the relatively fragile infrared transmitting window materials such as $BaF_2$ and ZnSe, which must be used in an infrared optical device. These high densities result also in much higher laser induced breakdown thresholds than found in lower density gases. Since the efficiencies of nonlinear processes increase at higher power densities this leads to more efficient devices. Further, at these very high densities collision rates are comparable to typical molecular rotational frequencies and, as a result, the molecular energy level structure is strongly perturbed. Motional narrowing effects lead to extremely narrow resonances in some liquids which can be exploited to enhance the nonlinear properties of the medium. Thus, the Q-branch of the vibrational two-photon resonance can be extremely narrow in liquid media due to these motional narrowing effects (less than 0.1 $cm^{-1}$ in simple diatomic cryogenic liquids). This can lead to a substantial resonance enhancement of the nonlinear optical efficiency. In contrast, the overall Q-branch envelope in the gas phase in the pressure region which has previously been investigated is several $cm^{-1}$ wide due to rotation-vibration coupling effects.

This invention uses liquid mixtures as the active medium in two-photon resonant four-wave mixing processes to achieve efficient nonlinear conversion of infrared laser frequencies. Said two-photon resonance is achieved by a substantial coincidence between the sum of two of the input laser frequencies ($\omega_1 + \omega_2$) and the frequency of a Raman-active vibrational mode of a molecular species which is a constituent of the liquid mixture. By substantial is meant within approximately ten times the Raman linewidth of the vibrational mode. The output frequency $\omega_{4\pm}$ is related to the input frequencies $\omega_1$, $\omega_2$ and $\omega_3$ by the equation:

$$\omega_{4\pm} = \omega_1 + \omega_2 \pm \omega_3$$

The three input frequencies may all be generated in separate lasers or, alternatively in the same laser cavity using appropriate dispersive elements. The limiting cases in which any two or all three of the laser frequencies are the same are also possible Third harmonic generation is obtained when all three incident frequencies are the same.

Suitable molecular liquid constituents for the process of this invention include, among others, $N_2$, $H_2$, $O_2$, $CO_2$, CO, NO, $CH_4$ and halogen substituted hydrocarbons in all of their isotopic forms. Suitable infrared laser sources include $CO_2$, $N_2O$, HF, DF, and CO lasers among others.

The efficiencies of these nonlinear optical processes depend in a complex fashion on the differences between the indices of refraction at the four frequencies involved and the focusing parameters of the optical system used to deliver the laser radiation to the nonlinear medium. As an example, the case of third harmonic generation is discussed; the optimizations of other fourwave mixing processes are the same in principle but differ somewhat in specifics. The output power of a four-wave mixing process is given by the expression:

$$P_4 = \kappa |\chi^{(3)}|^2 P_1 P_2 P_3 |J|^2$$

where $\kappa$ is a proportionality constant that depends on the wavelength of the incident light, $\chi^{(3)}$ is the third order susceptibility of the nonlinear medium, $P_1$, $P_2$ and $P_3$ are the incident optical powers and J is the phase-mismatch integral which describes the above-mentioned refraction and focusing effects. For the case of third harmonic generation, two simple limiting results for $|J|^2$ can be obtained. For tight focusing, wherein the confocal parameter b of the incident light is made much smaller than the liquid cell length $l$, $|J|^2$ reduces to $(\pi \Delta k b)^2 e^{\Delta k b}$ for $\Delta k < 0$ and is zero for $\Delta k > 0$. Here $\Delta k = k_{3\omega_1} - 3k_{\omega_1}$ is the wavevector mismatch which is due to the wavelength dependence of the liquid medium refraction. $|J|^2$ can be maximized by varying $\Delta k$ and/or $b$ such that $\Delta k = -2/b$. For loose focusing, wherein the confocal parameter b of the incident light is made much longer than the liquid cell length, $|J|^2$ reduces to $\sin^2(\Delta kl/2)/(\Delta kb/4)^2$. In this case, $|J|^2$ maximizes for $\Delta k = 0$. From these considerations, it is clear that both the optical system focusing parameters and the medium dispersion must be properly adjusted to optimize the four-wave mixing process.

The wavelength dependence of the index of refraction may be adjusted to optimize the nonlinear output by the use of additional molecular and/or atomic constituents which have a different wavelength dependence of the index of refraction from that of the active molecule. These additional consituents can also serve to fine-tune the vibrational resonance frequency relative to the input laser frequencies and to adjust the linewidth of the vibrational two-photon transition. These latter two adjustments can also be affected to some extent by varying the temperature of the liquid solution. Depending upon the particular application, it may be desirable to shift the vibrational frequency closer into resonance with the incident laser frequencies to obtain a higher $\chi^{(3)}$ or further out of resonance in order to avoid deleterious effects from other nonlinear processes such as two-photon absorption.

These additional constituents should be chosen so that they do not have any significant absorption at any of the frequencies $\omega_1$, $\omega_2$, $\omega_3$ and $\omega_{4\pm}$. They may have additional Raman-active modes which are not resonant with any combination of two of the input laser frequencies. Depending upon the particular application, these additional constituents can be either a second liquid which is mixed with the first liquid or an additional molecular species which is dissolved in the first liquid.

EXAMPLES

Figure 2:
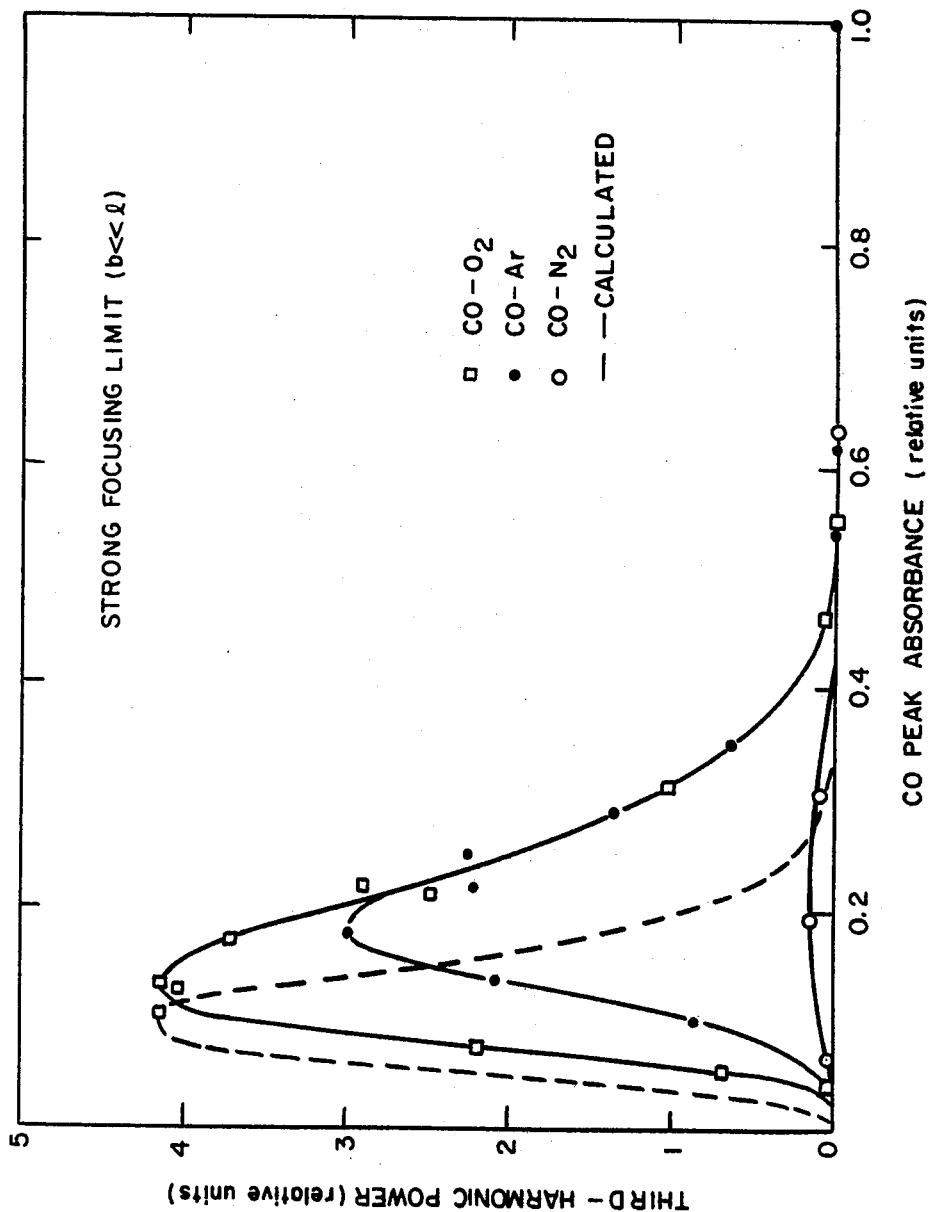
FIG. 2 is a plot of third harmonic power produced by the invention for different liquids in the tight focusing limit.

This example is intended to illustrate the process of this invention and not to limit same. Liquid carbon monoxide (CO) at a temperature of about 77 K has a Raman-active vibrational mode at about 2138 $cm^{-1}$, in close resonance with the second harmonic of the R(6) line of the (00°1)-(02°0) band of the $CO_2$ laser at 1069 $cm^{-1}$. Using a grating controlled, $TEM_{oo}$ mode, spontaneously mode-locked, $CO_2$ TEA laser with a pulse width of 170 nsec (FWHM) for the R(6) line, third harmonic generation with a power conversion efficiency of 0.3% has been obtained in a $CO-O_2$ liquid mixture in a tight focusing geometry. This embodiment of the invention is illustrated in FIG. 1. The $CO_2$ TEA laser 1 radiation was focused into a Dewar 2 containing the active liquid medium 3 through external Dewar BaF$_2$ windows 4 and inner Dewar cold windows (either BaF$_2$ or ZnSe) 5 using a 9.5 cm f.l. ZnSe lens 8. This resulted in a confocal parameter $b$ of 0.81 cm, much less than the liquid cell length of 5.8 cm. The CO$_2$ radiation was blocked from the detector 9 (InSb or Ge:Au) with 5mm-LiF and 6mm-quartz filters 10. The cryogenic liquid 3 is surrounded except at windows 5 by a lower boiling point cryogenic liquid 11 in the container 12. The liquid 11 cools liquid 3 and thereby keeps liquid 3 from boiling and thereby prevents inhomogeneities in the liquid medium. When cryogenic liquid 3 is liquid CO, a suitable cryogenic cooling liquid 11 is liquid N$_2$. The liquid CO medium posesses negative dispersion, $\Delta k < 0$, for third harmonic generation using a CO$_2$ pump laser beam. In pure CO liquid the coherence length $|\pi/\Delta k| = 0.058$ cm; $|J|^2$ may be optimized by varying $b$ or alternatively, by varying the medium dispersion by diluting the CO with additional constituents. FIG. 2 shows the third-harmonic signal generated in the tight focusing limit using the CO$_2$ laser 1 R(6) line as the pump. The cryogenic liquid 3 is CO diluted with the solvents O$_2$, N$_2$ and Ar. The CO concentration was monitored by measuring the peak absorbance of the second vibrational overtone transition near 6339 cm$^{-1}$. The relative CO peak absorbance is not exactly proportional to the CO concentration, since the linewidth of the second overtone transition is weakly solvent dependent. The dashed curve in FIG. 2 gives the calculated CO concentration dependance of the third-harmonic power neglecting any effects of the solvent on the $\chi^{(3)}$ resonance and any solvent dispersion. The maximum of the calculated curve has been arbitrarily set equal to the maximum of the CO-O$_2$ experimental curve. With these assumptions, both $\chi^{(3)}$ and $\Delta k$ vary linearly with CO density and the optimum third-harmonic efficiency is obtained by maximizing $|\chi^{(3)}|^2|J|^2$ which occurs for $\Delta k = -4/b$. The differences between the experimental curves of FIG. 2 arise because of the solvent dependences of the two-photon resonance frequency and linewidth. These solvent dependences can be used to fine-tune molecular vibrational resonances to better match available laser sources.

The most efficient THG is obtained for the CO-O$_2$ solution. At a relative CO peak absorbance of 0.125 (0.1 molar CO concentration), the maximum third-harmonic power conversion efficiency is 0.3% with 60 mJ focused into the liquid 3. The third-harmonic signal increases as the laser input power cubed up to the laser induced breakdown threshold of the liquid 3 at 390 J/cm$^2$. There was no evidence of saturation.

The CO-O$_2$ system provides an example of a two-component liquid used for tripling of CO$_2$ laser radiation. The CO provides the two-photon resonance and is the active molecule in the tripling process. The function of the O$_2$ is to dilute the CO concentration to optimize the third-harmonic signal. Three component liquid mixtures such as CO-O$_2$-N$_2$ can also be used. In this way, it is possible to independently fine-tune the resonance frequency and adjust the medium indices of refraction.

For a loose focusing geometry, which must be used for high energy applications, the optimal THG conversion efficiency is obtained for $\Delta k = 0$. This condition cannot be met by diluting the CO, rather a positively dispersive constituent must be added to the liquid mixture. SF$_6$ has a large positive dispersion between 3.12 $\mu$m and 9.36 $\mu$m due to its strong absorption band at 10.6 $\mu$m. Thus SF$_6$ can be used to compensate for the negative dispersion of a CO-O$_2$ liquid mixture. FIG. 3 shows the results of adding SF$_6$ to a CO-O$_2$ liquid mixture at 77 K. Increasing the SF$_6$ concentration from zero to 1.8 $\times$ 10$^{19}$ molecules/cm$^3$ in an 0.2 molar CO-O$_2$ solution enhances the third-harmonic output power by over a factor of 2000. The solid curve shows the calculated output power as the SF$_6$ concentration is varied based on known dipole moments for the CO and SF$_6$ absorption bands. The curve is dotted above a SF$_6$ concentration of 2.5 $\times$ 10$^{19}$ cm$^{-3}$ as this is the solubility limit of SF$_6$.

Further improvement of the THG efficiency can be achieved by either focusing to a shorter confocal parameter (in a denser CO medium) or adding a positively dispersive molecular constituent to the liquid mixture such that optimum dispersion can be reached without diluting the CO concentration.

Presently, we have not observed any limiting saturation effects and using commonly available CO$_2$ lasers we believe that incorporating the above improvements should allow THG at efficiencies of at least 10 percent.

Figure 4B:
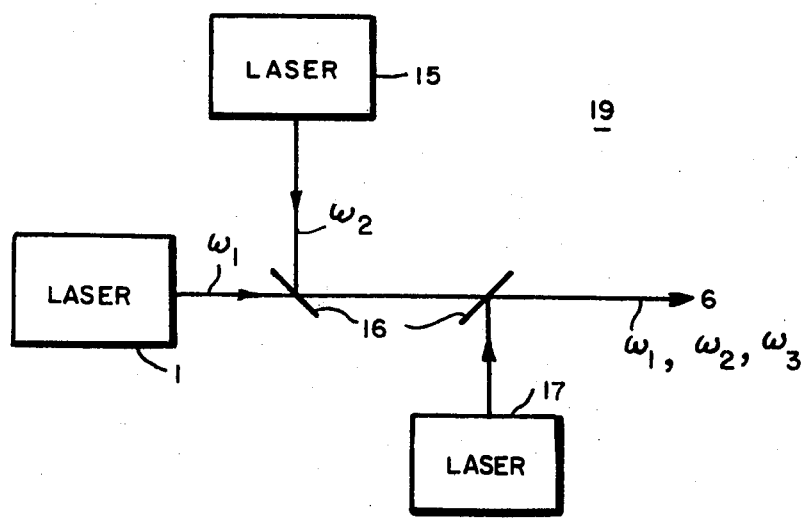
FIGS. 4(a) and 4(b) show other laser source combinations to be used in the invention.
Figure 4A:
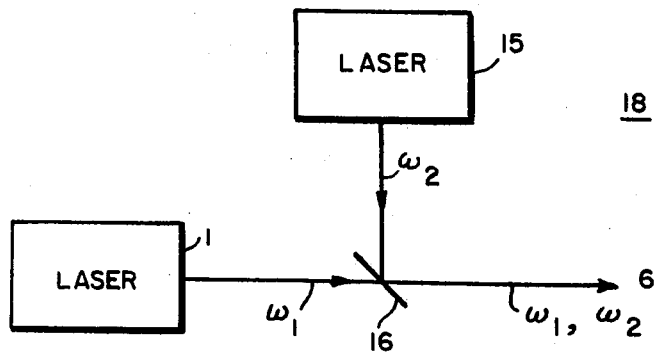

Liquid CO can also be used for efficient sum and difference frequency generation of CO$_2$ laser 1 radiation $\omega_1$ with the radiation $\omega_2$ from a second laser 15 as in the configuration 18 of FIG. 4(a). With $2\omega_1$ satisfying the two-photon resonance and $\omega_2$ chosen as any laser frequency, output can be generated at the frequencies $2\omega_1 \pm \omega_2$ at efficiencies comparable to the THG efficiency. The $2\omega_1 - \omega_2$ process in a tight focusing geometry has produced an output at 8.6 $\mu$m by mixing the CO$_2$ TEA laser 1 R(6) line, $\omega_1$, with the output of a 0.1 W cw CO$_2$ laser 15, $\omega_2$, operating on the R(24) line at 10.2 $\mu$m.

The laser source configuration 19 of FIG. 4(b) is used in conjunction with the apparatus of FIG. 1 if an output frequency $\omega_{4\pm} = \omega_1 + \omega_2 \pm \omega_3$ in output beam 13 is desired. The frequency $\omega_3$ is obtained from laser 17 and combined with the frequencies from lasers 1 and 15 in beam splitters 16 to form a beam 6 which impinges on liquid 3.

The principles demonstrated for the CO-O$_2$-SF$_6$ system are also equally applicable to other liquid systems. Phasematching in CO is possible using other molecules than SF$_6$. Molecules such as, i.e., SiH$_4$, CD$_4$ and SiF$_4$ are also useful. By choosing other molecules than CO, other laser lines can be resonantly tripled. Other nonlinear liquid systems with large resonance enhancement in the third order susceptibility tensor include, among others, N$_2$, H$_2$, O$_2$, CO$_2$, NO, CH$_4$, and halogen substituted hydrocarbons in all of their isotopic forms.

While the particular embodiments of the invention specifically discussed above seem preferable at the present time, modification thereto may occur to those skilled in the art without departing from the spirit and scope of the invention. Hence, the invention is not to be construed as limited to the particular embodiments shown and described herein, except as defined by the appended claims.

What is claimed is:
1. A coherent frequency source comprising:
a first molecular liquid,
means for minimizing optical inhomogeneities in said liquid,
a first input laser,
the frequency of said laser being substantially one-half a molecular vibrational two-photon resonance frequency of said liquid,
a means for passing the beam of said first laser through said liquid, the output beam from said liquid containing a component at a frequency equal to the third harmonic of the frequency of said first laser.

2. The frequency source of claim 1 comprising in addition:
a second liquid mixed with said first liquid to fine-tune the frequency of said molecular vibrational two-photon resonance of the first liquid.

3. The frequency source of claim 1 comprising in addition:
a second liquid mixed with said first liquid to vary the linewidth of said molecular vibrational two-photon resonance of the first liquid.

4. The frequency source of claim 1 comprising in addition:
a second liquid mixed with said first liquid to adjust the difference between the indices of refraction of the mixture at the frequencies of said first laser beam and its third harmonic with reference to the focusing parameters of said first laser beam.

5. The frequency source of claim 1 comprising in addition:
additional molecular constituents dissolved in said first liquid to adjust the difference between the indices of refraction of the resulting liquid at the frequencies of said first laser beam and its third harmonic with reference to the focusing parameters of said first laser beam.

6. The frequency source of claim 1 wherein:
said means for minimizing optical inhomogeneities in said liquid comprises maintaining said liquid below its boiling point.

7. A coherent frequency source comprising:
a first molecular liquid,
means for minimizing optical inhomogeneities in said liquid,
first and second lasers for providing coherent input beams of frequency $\omega_1$ and $\omega_2$, respectively, the frequency of said first laser $\omega_1$ being substantially one-half a vibrational two-photon resonance frequency of said liquid,
means for obtaining spatial overlap of said laser beams in said liquid,
means for obtaining temporal overlap of the output pulses from said lasers in said liquid, the output beams from said liquid containing components at frequencies of $2\omega_1 + \omega_2$ and $2\omega_1 - \omega_2$.

8. The frequency source of claim 7 comprising in addition:
a second liquid mixed with said first liquid to fine-tune the frequency of said molecular vibrational two-photon resonance of the first liquid.

9. The frequency source of claim 7 comprising in addition:
a second liquid mixed with said first liquid to vary the linewidth of said molecular vibrational two-photon resonance of the first liquid.

10. The frequency source of claim 7 comprising in addition:
a second liquid mixed with said first liquid to adjust the differences between the indices of refraction of the mixture at the frequencies $\omega_1$, $\omega_2$ and $2\omega_1 + \omega_2$ or the frequencies $\omega_1$, $\omega_2$ and $2\omega_1 - \omega_2$ with reference to the focusing parameters of said laser beams.

11. The frequency source of claim 7 comprising in addition:
additional molecular constituents dissolved in said first liquid to adjust the differences between the indices of refraction of the resulting liquid at the frequencies $\omega_1$, $\omega_2$ and $2\omega_1 + \omega_2$ or the frequencies $\omega_1$, $\omega_2$ and $2\omega_1 - \omega_2$ with reference to the focusing parameters of said laser beams.

12. The frequency source of claim 7 wherein:
said means for minimizing optical inhomogeneities in said liquid comprises maintaining said liquid below its boiling point.

13. A coherent frequency source comprising:
a first molecular liquid,
means for minimizing optical inhomogeneities in said liquid,
first and second lasers for providing coherent input beams of frequency $\omega_1$ and $\omega_2$, respectively, the sum of the frequencies of said first and second lasers, $\omega_1 + \omega_2$, being substantially equal to a vibrational two-photon resonance frequency of said liquid,
means for obtaining spatial overlap of said laser beams in said liquid,
means for obtaining temporal overlap of the output pulses from said lasers in said liquid, the output beams from said liquid containing components at frequencies of $2\omega_1 + \omega_2$ and $\omega_1 + 2\omega_2$.

14. The frequency source of claim 13 comprising in addition:
a second liquid mixed with said first liquid to fine-tune the frequency of said molecular vibrational two-photon resonance of the first liquid.

15. The frequency source of claim 13 comprising in addition:
a second liquid mixed with said first liquid to vary the linewidth of said molecular vibrational two-photon resonance of the first liquid.

16. The frequency source of claim 13 comprising in addition:
a second liquid mixed with said first liquid to adjust the differences between the indices of refraction of the mixture at the frequencies $\omega_1$, $\omega_2$ and $2\omega_1 + \omega_2$ or the frequencies $\omega_1$, $\omega_2$ and $\omega_1 + 2\omega_2$ with reference to the focusing parameters of said laser beams.

17. The frequency source of claim 13 comprising in addition:
additional molecular constituents dissolved in said first liquid to adjust the differences between the indices of refraction of the resulting liquid at the frequencies $\omega_1$, $\omega_2$ and $2\omega_1 + \omega_2$ or the frequencies $\omega_1$, $\omega_2$ and $\omega_1 + 2\omega_2$ with reference to the focusing parameters of said laser beams.

18. The frequency source of claim 13 wherein:
said means for minimizing optical inhomogeneities in said liquid comprises maintaining said liquid below its boiling point.

19. A coherent frequency source comprising:
a first molecular liquid,
means for minimizing optical inhomogeneties in said liquid,
first, second and third lasers for producing coherent input beams of frequency $\omega_1$, $\omega_2$ and $\omega_3$, respectively, the sum of the frequencies of said first and second lasers, $\omega_1 + \omega_2$, being substantially equal to a vibrational two-photon resonance frequency of said liquid,
means for obtaining spatial overlap of said laser beams in said liquid,
means for obtaining temporal overlap of the output pulses from said lasers in said liquid, the output beams from said liquid containing components at frequencies of $\omega_1 + \omega_2 + \omega_3$ and $\omega_1 + \omega_2 - \omega_3$.

20. The frequency source of claim 19 comprising in addition:
a second liquid mixed with said first liquid to fine-tune the frequency of said molecular vibrational two-photon resonance of the first liquid.

21. The frequency source of claim 19 comprising in addition:
second liquid mixed with said first liquid to vary the linewidth of said molecular vibrational two-photon resonance of the first liquid.

22. The frequency source of claim 19 comprising in addition:
a second liquid mixed with said first liquid to adjust the differences between the indices of refraction of the mixture at the frequencies $\omega_1, \omega_2, \omega_3$ and $\omega_1 + \omega_2 + \omega_3$ or the frequencies $\omega_1, \omega_2, \omega_3$ and $\omega_1 + \omega_2 - \omega_3$ with reference to the focusing parameters of said laser beams.

23. The frequency source of claim 19 comprising in addition:
additional molecular constituents dissolved in said first liquid to adjust the differences between the indices of refraction of the resulting liquid at the frequencies $\omega_1, \omega_2, \omega_3$ and $\omega_1 + \omega_2 + \omega_3$ or the frequencies $\omega_1, \omega_2, \omega_3$ and $\omega_1 + \omega_2 - \omega_3$ with reference to the focusing parameters of said laser beams.

24. The frequency source of claim 19 wherein:
said means for minimizing optical inhomogeneities in said liquid comprises maintaining said liquid below its boiling point.

* * * * *